Aug. 16, 1966  R. L. BAILEY  3,266,292
METHOD FOR DETECTING VOLATILE ORGANIC CONTAMINANTS
IN REUSABLE CONTAINERS
Filed June 8, 1964  4 Sheets-Sheet 3
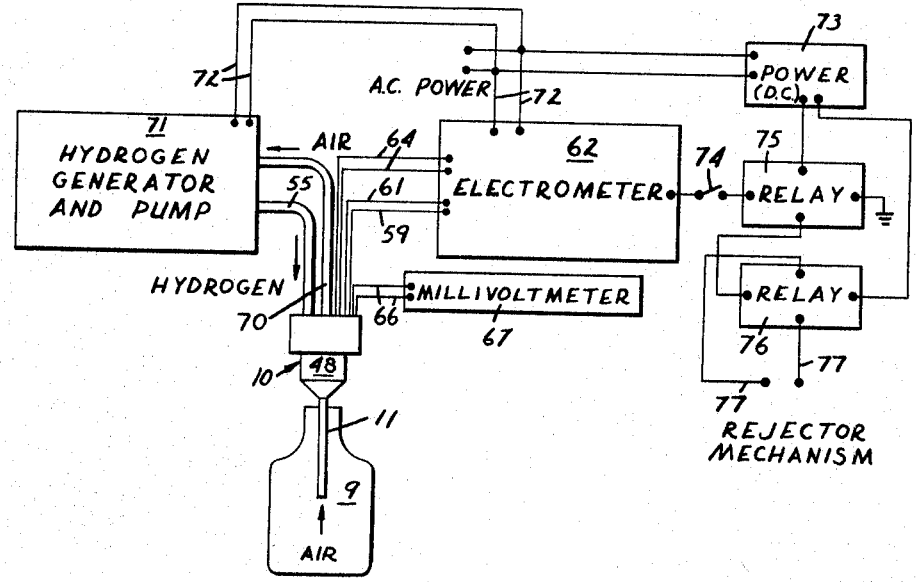
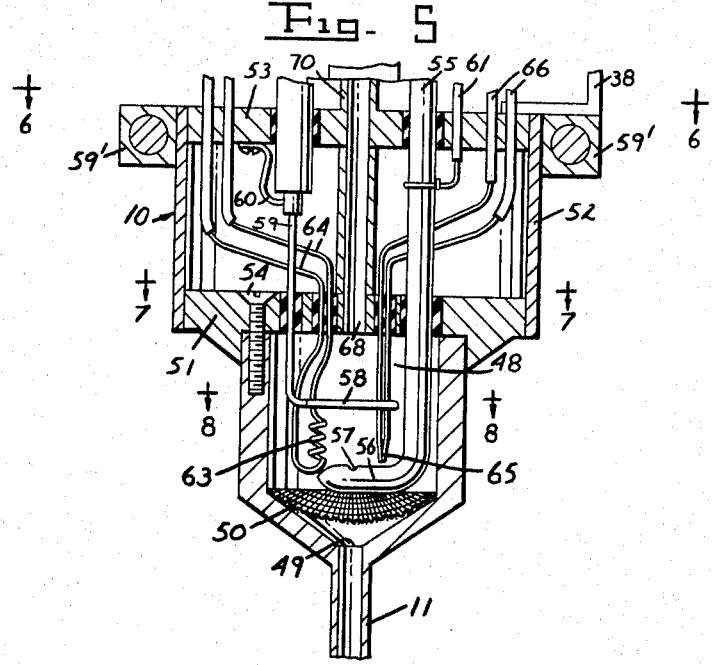
INVENTOR.
ROBERT L. BAILEY Aug. 16, 1966            R. L. BAILEY           3,266,292
METHOD FOR DETECTING VOLATILE ORGANIC CONTAMINANTS
IN REUSABLE CONTAINERS
Filed June 8, 1964                                  4 Sheets-Sheet 4
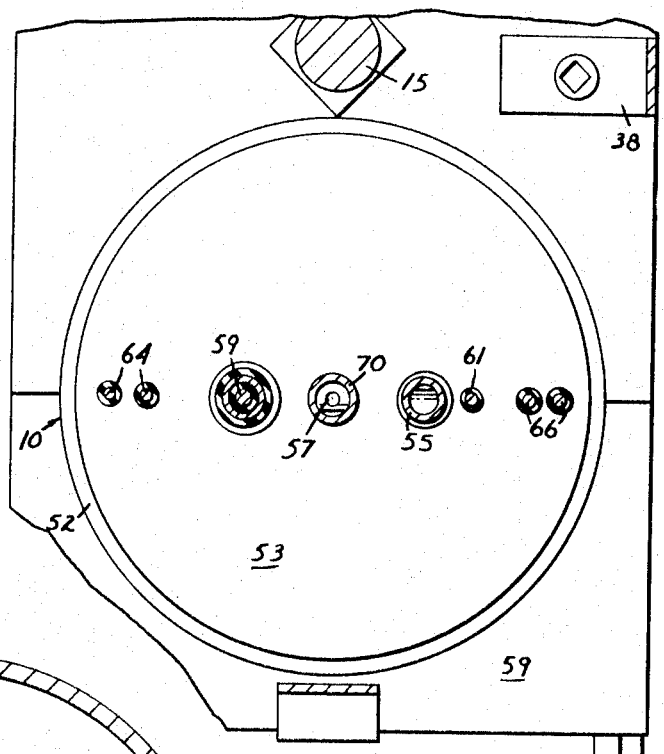
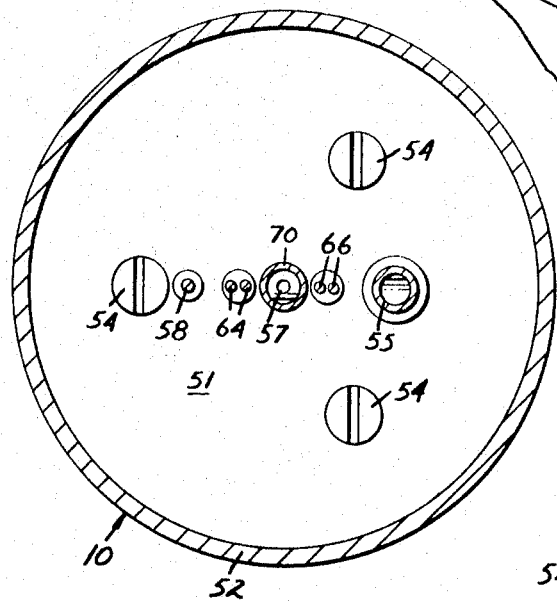
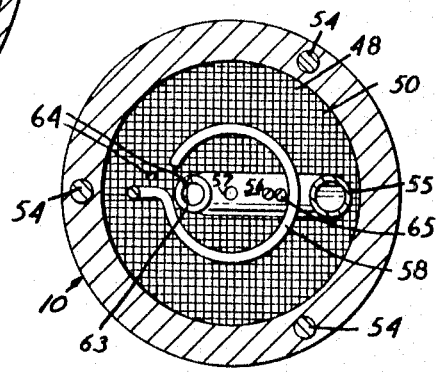
INVENTOR.
ROBERT L. BAILEY
BY *Wells & St. John*
ATTYS.

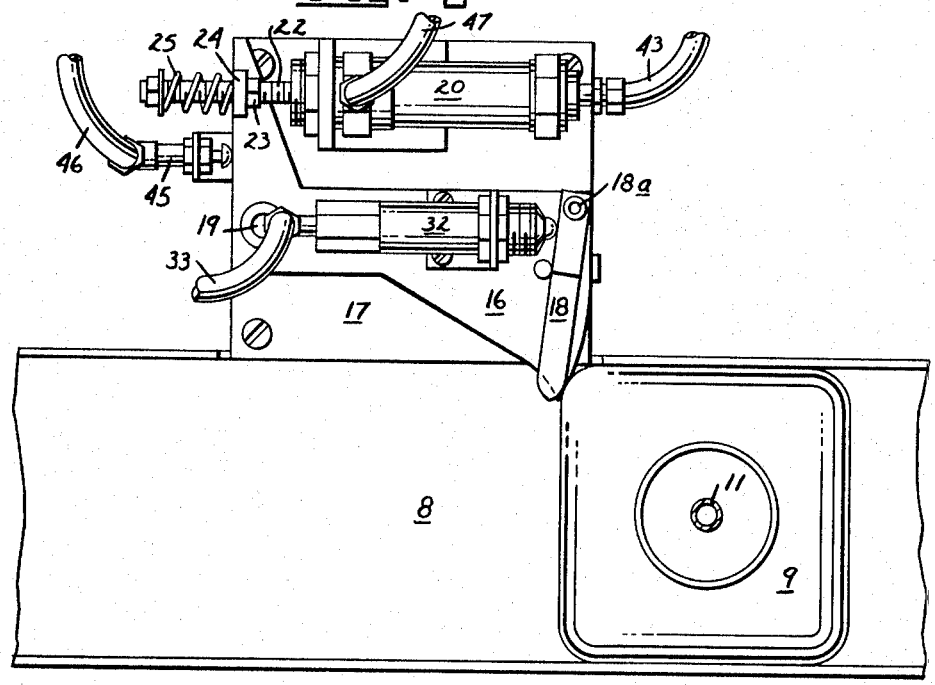
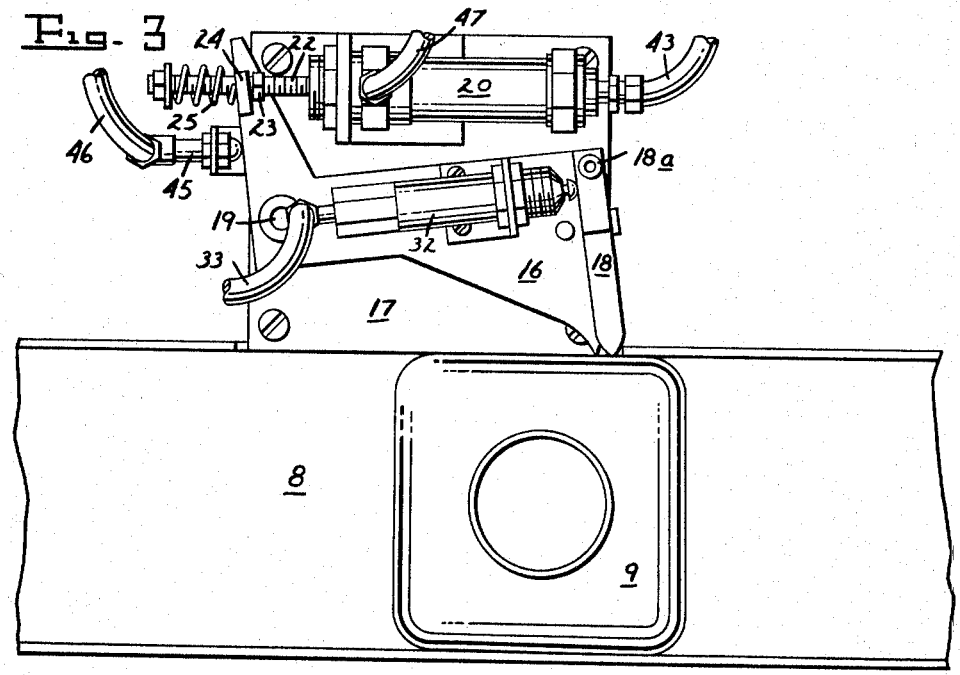

United States Patent Office 3,266,292
Patented August 16, 1966

3,266,292
METHOD FOR DETECTING VOLATILE ORGANIC CONTAMINANTS IN REUSABLE CONTAINERS
Robert L. Bailey, Spokane, Wash., assignor, by mesne assignments, to National Distillers and Chemical Corporation, a corporation of Virginia
Filed June 8, 1964, Ser. No. 373,310
5 Claims. (Cl. 73—23)

This invention relates to a noxious odor detector and a method of detecting such odors in bottles, jars and similar containers.

This invention is primarily concerned with the detection of organic vapors within containers such as jars or bottles having a relatively enclosed interior space. More specifically, although the invention is not to be restricted to one field, the device is adapted for use in detecting the presence of organic substances in milk bottles, whether the bottles are made of glass or plastic material. The storage of organic solvents, gasoline or similar material in bottles that are later washed and reused in the delivery of milk poses difficult quality control problems that often affect the taste of the milk. The present device is adapted to provide a production apparatus by which such vapors can be detected so that contaminated bottles will not be refilled with a food substance.

It is a first object of this invention to provide a novel method of testing small samples of atmosphere drawn through the restricted inlet of a bottle. The atmosphere is tested by burning it within a cell equipped so as to ionize foreign substances. The ionization of the foreign substances varies the electric potential across two detection elements, the varience being measured by conventional devices which may be utilized to operate a rejection mechanism.

Another object of this invention is to provide a relatively simple mechanical arrangement for obtaining a sample of atmosphere from each container to be tested.

Another object of this invention is to provide a movable sensing cell usable to successively test individual containers, the cell being provided with an inlet tube adapted to selectively extend into a container during testing.

These and further objects will be evident from a study of the following disclosure, taken together with the accompanying drawings which illustrate in detail one preferred structure. It is to be understood that this structure is not intended to limit or restrict the scope of the invention, which is set out in the claims that follow.

In the drawings:

FIGURE 2 is an enlarged sectional view taken along line 2—2 in FIGURE 1;

FIGURE 3 is a view similar to FIGURE 2 showing the passage of bottles past the stop mechanism;

FIGURE 4 is a schematic diagram showing the various components utilized in the sensing apparatus;

FIGURE 5 is a vertical cross-sectional view taken through the sensing cell;

FIGURE 6 is an enlarged sectional view taken along line 6—6 in FIGURE 5;

FIGURE 7 is an enlarged sectional view taken along line 7—7 in FIGURE 5; and

FIGURE 8 is an enlarged sectional view taken along line 8—8 in FIGURE 5.

*General apparatus*

Figure 1:
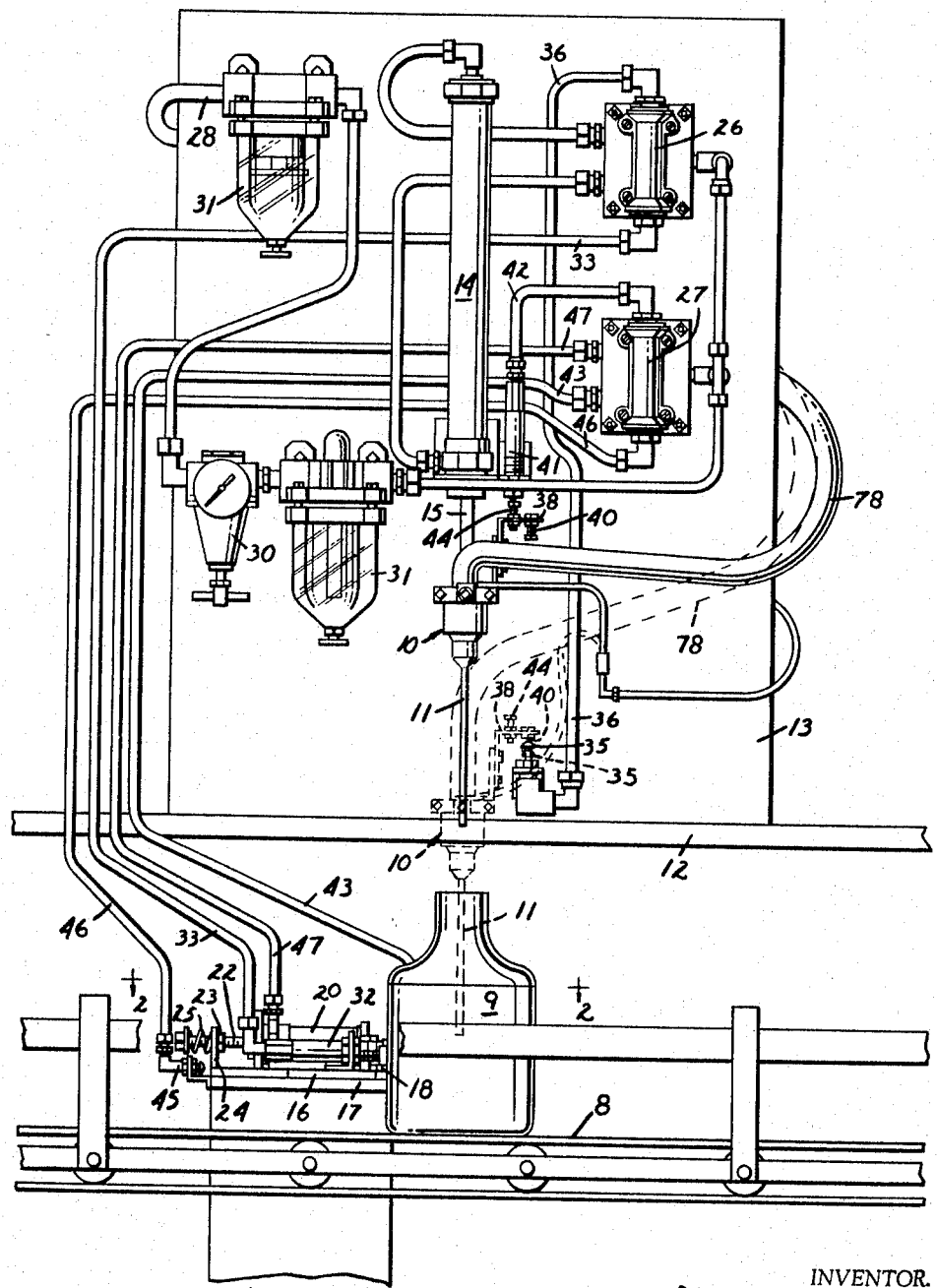
FIGURE 1 is a front view of the complete apparatus showing the device with the sensing apparatus in its retracted position, the inserted or extended position of the sensing apparatus being illustrated in dashed lines.

The general mechanical arrangement by which samples of atmosphere are removed from individual jars or bottles is best seen with reference to FIGURES 1 through 3. In these figures, a sensing cell 10 is illustrated with a downwardly extended inlet tube 11 through which atmosphere is drawn from the interior of a typical bottle 9 shown on a conveyor 8. The shape of the bottle 9 is immaterial to the practice of the invention, although the apparatus is particularly designed for bottles or jars having restricted inlet openings that confine the interior of the bottle. The type of conveyor 8 is not particularly important so long as it is a conveyor of the continuous moving type, frictionally engaging the bottles 9, but allowing the bottles 9 to be stopped without retarding the action of the conveyor.

The device is shown mounted on a rigid supporting framework 12, which has fastened to it a cabinet 13 including an upright wall on which the various components shown in FIGURE 1 are mounted. The cabinet 13 may house the various electronic components utilized in connection with the sensing cell 10, as will be described in detail below. Mounted on the upright wall of the cabinet 13 is a positioning cylinder 14 having a shiftable piston rod 15 at the end of which is fixed the cell 10. The rod 15 is shown mounted for movement along a vertical axis. This particular attitude is most feasible for use in conventional facilities where the bottles 9 are normally traveling along a horizontal conveyor 8.

Directly above the conveyor 8 is a movable stop 16 mounted on a base 17 for pivotal motion about an axis 19. The stop 16 is adapted to be movable between the extended position shown in FIGURE 2 and the retracted position shown in FIGURE 3. As seen in FIGURE 2, the front surface of the stop 16 when extended, prevents additional movement of the abutting bottle 9. When shifted to the position shown in FIGURE 3, the stop 16 clears the bottle 9 and allows it to pass due to the movement of the conveyor 8. The purpose of the stop 16 is to temporarily prevent movement of the bottle 9 during insertion of the tube 11 to enable the device to obtain a sample of atmosphere from within the bottle 9. In FIGURES 1 and 2 the bottle 9 is shown in its position for testing.

The basic apparatus shown in FIGURES 1 through 3 is adapted to stop each individual bottle 9, insert into the bottle the tube 11, draw a sample of atmosphere from the bottle 9, remove the tube 11, and then allow the bottle 9 to proceed with the conveyor 8. This is accomplished by means of a pneumatically controlled arrangement generally shown in the drawings, utilizing conventional valves and cylinder components which will not be described in structural detail.

Mounted on the movable stop 16 is a protruding actuating arm 18 pivoted about a pin designated by the numeral 18a. The movable stop 16 is controlled by means of a cylinder 20 mounted on base 17 and provided with a reciprocable piston rod 22. The outer end of rod 22 is threaded as shown in FIGURES 2 and 3 and receives a nut 23 adapted to abut a bracket 24 extending from the side of the stop 16. The opposite side of the bracket 24 is abutted by a spring 25 that encircles the outer end of rod 22 and abuts the rod 22 at its extremity. Expansion of the cylinder 20 will cause the rod 22 to move to the left as shown in FIGURE 3, pivoting the stop 16 about the pivotal axis 19 to positively cause the stop 16 to clear the moving bottle 9. When the cylinder 20 is retracted, the rod 22 will move freely relative to bracket 24, the bracket 24 being biased to its original position (FIGURE 2) by the spring 25. However, should a bottle 9 be in the path of movement of the stop 16, the lost motion connection provided by the spring 25 will allow the stop 16 to remain clear of bottle 9 until it has passed, at which time the spring 25 will return the stop 16 to the position shown in FIGURE 2.

The pneumatic system that operates the various devices in the sequence previously described can be best understood from a study of FIGURES 1 through 3. A supply line 28 is utilized to carry air under the required operating pressure to the various components that operate cylinders 14 and 20. The supply line 28 is provided with a pressure regulator 30 and filters 31. The line 28 leads to a pair of control valves 26 and 27 which respectively operate the double acting cylinders 14 and 20.

In order to detect the presence of a bottle against the extended stop 16, the actuating arm 18 operates a valve 32 mounted on the arm 16. The valve 32 is connected by means of tubing 33 to the bottom inlet of the control valve 26. When pressure is exerted on the valve 32 by means of the arm 18, the control valve 26 will shift so as to cause pressure from supply line 28 to be directed to the top end of cylinder 14. This will cause the piston rod 15 to move downwardly relative to the cabinet 13, thereby inserting the tube 11 within the bottle 9.

Downward movement of the rod 15 will continue until a lower valve 35 on the cabinet 13 is actuated. The valve 35 is adapted to be contacted by means of an adjustable screw 40 mounted on a side bracket 38 fixed to the cell 10. The dashed line position illustrated in FIGURE 1 shows the contact of the valve 35 by the screw 40. The valve 35 is connected by means of tubing 36 to the top inlet of control valve 26, and is adapted to reverse the position of the valve 26 so as to cause operating pressure to be directed to the bottom of the double acting cylinder 14. This will reverse the position of the sensing cell 10 and cause it to be raised once more to the position shown in full line in FIGURE 1.

Also mounted on the cabinet 13 is an upper control valve 41 adapted to be abutted by an upwardly directed screw 44 on bracket 38. The valve 41 is connected to the top inlet of control valve 27 by means of tubing 42. When valve 41 has been contacted by screw 44, it will cause the control valve 27 to expand the cylinder 20 due to its connection by supply tube 43, which will be provided with high pressure air. This expansion of cylinder 20 in turn pivots the stop 16 to the position shown in FIGURE 3, thereby allowing the bottle 9 to pass the stop 16.

When the stop 16 has been fully pivoted, it will contact a fourth control valve 45 mounted on the base 17 and connected by means of tubing 46 to the bottom of the control valve 27. This contact of valve 45 will reverse the orientation of control valve 27, directing high pressure air through a supply tube 47 to the opposite end of cylinder 20 to cause the piston rod 22 thereof to be retracted, permitting the stop 16 to return to its original abutting position shown in FIGURE 2 in the manner previously described.

The pneumatic system utilized to perform the operational sequence previously described uses conventional valve devices in the particular combination to stop individual bottles for testing purposes and to allow them to again move after the test has been completed. It is believed that the structure utilized will be evident from the foregoing description and from the detailed drawings shown in FIGURES 1 through 3. The operation of the device is believed to be evident from the description and drawings.

Sensing cell

The details of the sensing cell 10 can best be seen in FIGURES 5 through 8. The cell comprises a lower hollow cylindrical chamber 48 made of brass. The chamber 48 has a restricted lower inlet 49 in open communication with the downwardly extending hollow inlet tube 11. The inlet 49 of the chamber 48 is provided with a diffusing screen 50. The lower chamber 48 is covered by a cover plate 51 held in place by three screws 54. The plate 51 is of greater diameter than the chamber 48, and is enclosed along its upper portion by a cylindrical cover 52 secured thereto, and sealed to a top mounting plate 53 engaged by a collar 59' to which in turn is fixed the lower end of the piston rod 15 and the bracket 38 previously described (FIGURE 6).

Extending through the plates 51 and 53 and into the interior of the lower chamber 48 is a hydrogen tube 55 terminating at a flame nozzle designated by the numeral 56. The nozzle 56 is provided with an upwardly directed small orifce 57 through which hydrogen gas escapes into the interior of the chamber 48.

Spaced from the flame nozzle 56 and located coaxially above the orifice 57 is a horizontal collector ring 58 made of electrically conductive material having a shield grounded to plate 53 by a short connecting wire 60. The tube 55 is also made of electrically conductive material. Ring 58 and tube 55 are respectively connected by leads 59, 61 to an electrometer, which will be described below.

The purpose of the orifice 57 is to provide a small stream of hydrogen for burning purposes. In order to ignite this hydrogen, an igniter coil 63 is provided directly adjacent to the orifice 57. The resistance coil 63 is provided with leads 64 that extend to the electrometer 62, which, in preferred form, includes a suitable source of low voltage power for heating the coil 63.

In order to provide remote monitoring of the flame at orifice 57, a thermocouple 65 is provided adjacent to to the orifice 57. The leads 66 from the thermocouple 65 are wired to a millivoltmeter which shows the voltage produced in the thermocouple 65 due to the flame at the orifice 57.

Coaxially with the inlet 49 of chamber 48 is an upper outlet 68 connected by means of tubing 70 to a vacuum pump unit shown in FIGURE 4 is a combination hydrogen generator and pump unit 71.

A suitable source of alternating current power 72 is wired to the electrometer 62 and to the pump and generator unit 71. It is also wired to a direct current unit 73 to provide the necessary direct current for the operation of the relays controlled by electrometer 62. A main control switch 74 is interposed between the electrometer 62 and a low voltage relay 75. The electrometer 62 is utilized to control the relay 75, which in turn operates a more powerful relay 76, to control a rejector mechanism (not shown) connected to leads 77. The particular rejector mechanism might be an audible or visible signalling device, or it might be an apparatus for controlling a conveyor network. It might also be a device for puncturing plastic bottles found to be contaminated so that the bottles would automatically not be filled by conventional vacuum filling methods.

The basis of the detection system is the hydrogen flame detector similar to those in use with commercial gas chromatographs. The particular detector shown in the drawings was designed to be better adapted to the testing of bottles. It is designed to draw air from within a bottle, up through the cell 10 and to sense the presence of organic vapors.

The internal volume of the chamber 48 is preferably as small as practical in order to reduce the time required for a pulse of sample atmosphere to be taken in from a bottle and then flushed out prior to the reception of the next pulse. The tube 55 is the negative electrode of the apparatus and the collector ring 58 is the positive electrode. Both are insulated from the grounded body of the chamber 48 and the from the plates 51 and 53. The igniter wire leads 64 and the thermocouple 65 are also held in place within the chamber 48 by means of suitable insulating materials such as epoxy cement. "Teflon" (tetrafluoroethylene) has been used for the electrode insulation instead of the epoxy cement because of the high impedance necessary (about $1 \times 10^{10}$ ohms). All electrodes and wires are securely attached to the mounting plate 53 and all of the various wires are shown in FIGURE 1 enclosed within a covering cable 78.

The flame jet tube 55 is connected to the pump and hydrogen generator unit 71. The hydrogen is burned in a tiny flame at the orifice 57 in a stream of atmosphere drawn up through the lower tube 11. A small pump contained in the unit 71 is attached to the tubing 70 to pull the sample and combustion products through the detector cell 10. As the atmosphere being drawn into the chamber 48 mixes with hydrogen and burns, vapors of organic contaminants are also consumed in the flame. The carbon atoms of organic substances give rise to ions which will migrate between the electrodes (the flame jet 57 and ring 58). This gives rise to a small electrical current which is measured by the amplifier within electrometer 62 connected by leads 61, 59 in a circuit containing the tube 55 (negative electrode) and the collecting ring 58 (positive electrode). The measured current is proportional to the concentration of organic substances over a million fold concentration range. By the instruments to be described, as little as $10^{-9}$ grams of substance can be detected.

The igniter coil 63 is preferably made of resistance wire such as "Nichrome" which is connected to a low voltage power source (3 to 4 volts) contained in the electrometer 62. When turned on, the coil heats to a red heat which ignites the hydrogen flame at the orifice 57. The flame normally stays lit and the igniter coil 63 is used only at start-up. The thermocouple 65 is preferably an iron-constantan thermocouple positioned near the flame at orifice 57. Its attachment to the millivoltmeter 67 as previously described indicates to the operator of the apparatus whether or not the flame is lit.

The pump and hydrogen unit 71 is a conventional device designated as Model A-650 by Wilkens Instrument and Research, Inc. It operates from a conventional 110 volt A.C. circuit and produces hydrogen by electrolysis of water at the rate of 15-30 ml. per minute. It includes a small diaphragm pump which is used to draw air and sample through the detector cell 10 at the rate of about 300 ml. per minute. The pump must be reconnected in the apparatus as commercially obtained so as to pull air rather than push it.

The electrometer amplifier 62 is also a commercial unit, Model A-600-C manufactured by Wilkens Instrument and Research, Inc. The electrometer provides the polarizing potential for the electrodes in the detector cell 10 and amplifies the signal produced in the cell to about 1 millivolt at 100-1,000 microamps. The power supply for the igniter coil 63 is contained within the Model A-600-C electrometer.

While particular commercial units have been described in connection with the sensing cell 10, it is to be understood that similar devices could be substituted in their places, and that the particular structures designated in this disclosure are not intended to limit the scope of the invention. This invention is primarily concerned with the method of testing bottles for organic contaminants and the physical apparatus by which samples are obtained from individual bottles.

Noxious, i.e., hurtful, harmful or injurious, odors are created within reusable containers for food and the like, such as milk bottles, primarily by organic vapors. The storage of organic solvents, gasoline and the like in bottles whether plastic or glass, will leave some of these vapors even though the bottle is carefully washed for reuse. Thus, the noxious odor detector detects primarily organic vapors. It will not detect or provide an indication of vapors normally present in a clean and washed container, such as the usual vapors present in air in a bottling plant. Thus the detector is selective in distinguishing vapors which create a noxious odor and this in combination with the other disclosed features, is an important part of this invention.

Having thus described my invention, I claim:
1. A method of inspecting reusable open end containers, such as bottles, jars and the like used for packaging foodstuffs, for the presence of volatile organic contaminants in the containers, the method comprising:
    (a) moving relative to one another a succession of reusable open end containers which have been prepared for refilling and an atmospheric sampler,
    (b) removing a sample of atmosphere from at least one of the succession of containers into the sampler,
    (c) passing the removed sample to a detection cell capable of detecting organic vapors and gases,
    (d) detecting the presence of any such organic vapors and gases in the removed sample,
    (e) and rendering unusable for refilling any container detected to have organic vapors and gases in the sample removed from that container.
2. The method as in claim 1 wherein a sample is removed from each container moved in succession relative to the atmospheric sampler.
3. A method as in claim 1 wherein the removing of a sample is accomplished by inserting a tubular sampler into the interior of each container and applying a vacuum to the sampler.
4. A method as defined in claim 1 further comprising stopping each container during the relative movement of containers and sampler while each container is adjacent the sampler, and flushing the detection cell with uncontaminated atmosphere after each sample is passed therethrough and before a sample is removed from another container in the succession of containers.
5. A method of inspecting reusable open end containers, such as bottles, jars and the like used for packaging liquid foodstuffs, for the presence of volatile organic contaminants in the containers, the method comprising:
    (a) moving a succession of reusable open end containers which have been prepared for reuse prior to packaging the foodstuffs therein in a line past an atmospheric sampler,
    (b) stopping each container adjacent the atmospheric sampler,
    (c) inserting a tubular sampler through the open end of the stopped container into the interior of the stopped container,
    (d) applying vacuum to the tubular sampler to remove a sample from the interior of the container,
    (e) passing the removed sample to a detection cell capable of detecting organic vapors and gases,
    (f) rendering unusuable for refilling any container detected to have organic vapors and gases in the interior thereof,
    (g) flushing the detection cell with uncontaminated atmosphere after each sample has passed therethrough and before a sample is removed from another container in the succession of containers,
    (h) and intercontrolling the stopping of each container with the insertion of the sampler.

References Cited by the Examiner
UNITED STATES PATENTS
3,101,848  8/1963  Uhlig _____ 209—72
3,127,773  4/1964  Blumenfeld _____ 73—423

RICHARD C. QUEISSER, *Primary Examiner.*
J. FISHER, *Assistant Examiner.*